April 1, 1952 — G. BANKO — 2,591,227
COUNTERBALANCE FOR OPTICAL PROJECTION
VIEWER FOR MACHINE TOOLS
Filed March 15, 1951 — 2 SHEETS—SHEET 1

INVENTOR.
GEORGE BANKO
BY Sanford Schnurmacher
ATTORNEY

April 1, 1952

G. BANKO 2,591,227

COUNTERBALANCE FOR OPTICAL PROJECTION
VIEWER FOR MACHINE TOOLS

Filed March 15, 1951

INVENTOR.
GEORGE BANKO
BY
Sanford Schnurmacher
ATTORNEY

Patented Apr. 1, 1952

2,591,227

UNITED STATES PATENT OFFICE 2,591,227

COUNTERBALANCE FOR OPTICAL PROJECTION VIEWER FOR MACHINE TOOLS

George Banko, Euclid, Ohio

Application March 15, 1951, Serial No. 215,804

6 Claims. (Cl. 51—166)

This invention relates to supports and particularly to a counterbalancing bracket for auxiliary apparatus mounted on the end of a machine tool table.

Conducive to a better understanding of this invention, it may be well to point out that in the optical method of profile, image or templet grinding of special shapes, lamination die parts and intricate form tools, it is necessary to mount work illuminating and viewing apparatus on the grinding machine table in such a manner that the work-piece, grinding wheel and optical apparatus are maintained in fixed alignment in all possible positions of the work being shaped.

The optical apparatus is necessarily mounted at the end of the work supporting table in order to leave the greatest possible table area free to support the work-piece thereon. An optical viewer capable of projecting an enlarged real image of the viewed face of a work-piece upon an eighteen inch square screen, such as is described in my United States Patent No. 2,481,381, entitled "An Optical Projection Viewer for Machine Tools," dated September 6, 1949, is necessarily rather heavy. The reason for this being that the viewer structure must be built sufficiently rigid and rugged to prevent any vibration, due to the operation of the machine tool, from being communicated to the viewing screen in the form of an unsteady image.

This is especially true when it is realized that magnifications in the order of 100:1 are often employed. The weight of the optical viewer, being necessarily concentrated on the extreme end of the machine table, causes the table to tilt or spring slightly when moved to its extreme position, no matter how accurately the table ways be machined, since there must be sufficient clearance between the table and the ways to permit relative movement therebetween.

Although the magnitude of this deviation may involve but a few thousandths of an inch, when the table is at its extreme position, even this small variation cannot be tolerated under conditions where accuracy in the nature of one ten-thousandth of an inch is required, as is often the case when mating punch and die elements are to be shaped.

The primary object of this invention therefore is to provide a support for overhanging auxiliary apparatus attached to one end of a machine tool table, such as described in my above mentioned patent, which permits the table to be moved freely on its ways while at the same time positively supporting the auxiliary apparatus so that any tendency of the table to spring or tilt, due to the weight of said apparatus is prevented.

Another object is to provide a device of the type stated that is operable with tables mounted on cross-feed saddles so that positive support may be given under conditions involving both longitudinal and transverse motion.

Further objects are to provide such a device that is economical in cost, easily applied to existing machine tools, and that will maintain its supportive accuracy over a long period of time without the necessity of frequent inspection and adjustment.

These and other objects of the invention will become apparent from a reading of the following specification and claims, together with the accompanying drawings in which like parts are referred to and indicated by like reference characters and wherein;

Figure 8 is an enlarged view, partly in section of the counter-balancing roller and activating spring.

Figure 1:
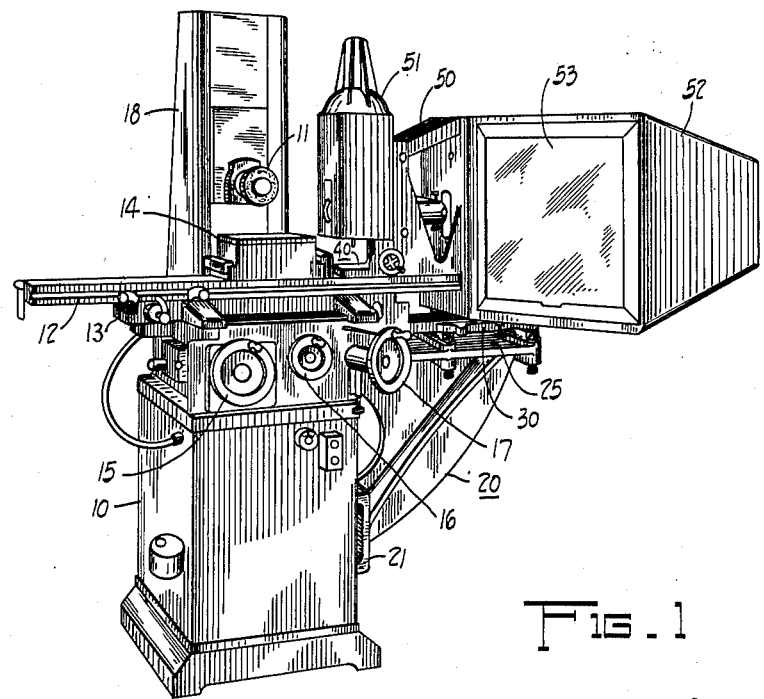
Figure 1 is a perspective view of the support which is the subject of this invention combined with a conventional surface grinder and optical viewer.

Now referring to the drawings there is seen in the Figure 1 a conventional surface grinder having a base 10 and a tool holding pillar 18 on which is mounted a vertically adjustable grinding wheel 11 rotatable on a horizontal axis.

Reference numeral 13 indicates a cross-feed saddle mounted on the base 10 beneath the grinding wheel 11. A table 12 is slidably mounted on the saddle 13 on ways positioned crosswise of the saddle to permit longitudinal movement of the table beneath the grinding wheel 11. A work holding fixture or vise 14 is immovably mounted on the table 12 and can be manipulated in a single plane either longitudinally or transversely of the grinding wheel in response to rotation of the hand wheels 15 and 16 respectively. The grinding wheel 11 is adjustable vertically with reference to the table 12 by means of the hand wheel 17.

Reference numeral 50 broadly indicates an optical viewer such as that described in my hereinabove mentioned patent. The viewer is intended to be mounted on the extreme end of a machine tool table such as that identified by the reference numeral 12 in the Figure 1. As shown therein the projection system of the viewer must be aligned with the tooled edge of the workpiece so that an enlarged real image of the tool and work-piece is projected in natural color upon the screen 53 which may be scribed with contour guide lines indicating the shape to which the work is to be ground.

An optical viewer constructed as indicated in the above mentioned patent includes a light source 51 and a cabinet 52 containing the necessary lens and reflecting mirrors by means of which an enlarged real image of the viewed face of the work-piece is thrown on a ground glass screen 53.

In order to provide the rugged and rigid structure necessary to assure a vibration free image the device is made of castings, and sheet material of heavy gage.

The deforming stress brought to bear on the table end by the weight of this overhanging structure is counterbalanced by the sustaining action of the hereinafter described support which is the subject of this invention.

The support consists broadly of three elements namely, the bracket 20, the transfer-plate 30 and the carriage 40; each of which will be described in detail herein.

The bracket 20 is made in the form of a heavy steel casting substantially right-triangular in shape. The triangular bracket lies mounted on the side of the machine base 10 in an inverted position, so that what would normally be regarded as the base of the triangle is uppermost, and forms a horizontally extending platform 25 which is aligned with the longitudinal center line of the table 12 but in a plane below that of the saddle 13. Feet 21 of the bracket, which bear against the side of the base 10, are held in place by means of bolts 22.

Reference numeral 23 indicates a supporting rib of substantial horizontal width, extending from the outer end of the platform 25 to the lower foot 21. A vertical stiffening web 24 intersects the rib 23 and joins the vertical and horizontal edges of the bracket to create a bracket of maximum rigidity.

Figure 2:
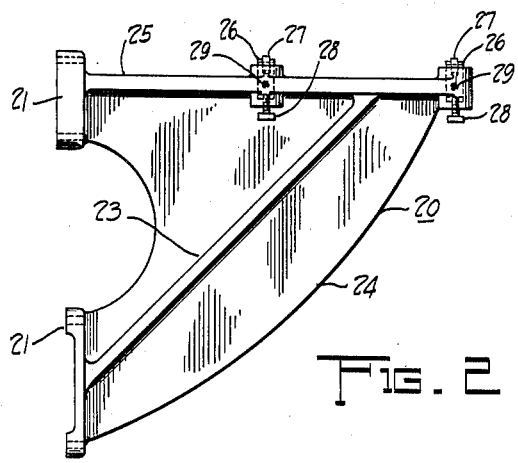
Figure 2 is a front elevation of the bracket.
Figure 4:
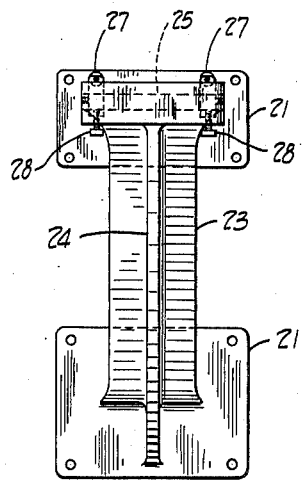
Figure 4 is a right end view of the same.
Figure 3:
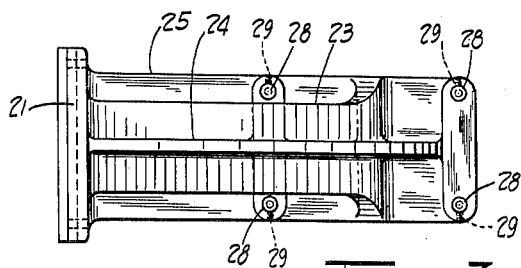
Figure 3 is a bottom view of the bracket.

Two sets of paired rollers 27 are rotatably mounted in pistons 26 which are fitted in sockets in the platform 25, as shown in the Figures 2, 3 and 4.

The rollers are positioned with their axes of rotation perpendicular to the ways of the saddle 13. The roller pistons 26 are adjustable vertically of their sockets by means of screw 28 and are locked in place by set screws 29. The paired rollers are spaced so as to form a firm four point support for the hereinafter described transfer plate 30.

The transfer plate 30 is substantially rectangular in shape with plane upper and lower surfaces and is of sufficient thickness to be rigid.

The transfer plate is rigidly mounted on the side of the saddle by means of bolts 33 that pass through threaded holes 32 in the tongue 31. The tongue 31 is seated in a slot or recess cut in the side of the saddle, as is most clearly shown in the Figure 5.

A first pair of spaced cross rails 34 positioned parallel to the saddle ways are mounted on the lower face of the transfer plate. The rails 34 are spaced so that they will rest on the rollers 27 and ride thereon when the saddle is moved transversely of the base 10. A second pair of parallel rails 35 are mounted longitudinally of the upper surface of the transfer plate. These rails are positioned parallel to the projected extension of the ways of the table 12.

The carriage 40 comprises a plate that is adapted to be bolted to the top of the table 12 at the end thereof and includes a pair of spaced sockets containing inverted pistons 41 having rollers 42 mounted on the lower ends thereof.

These two sockets are spaced so that their rollers 42 will rest and ride on the rails 35. A stiff spring 43 whose tension is regulated by a screw 44 is positioned in each socket above the piston 41 as shown in the Figure 8.

Figure 5:
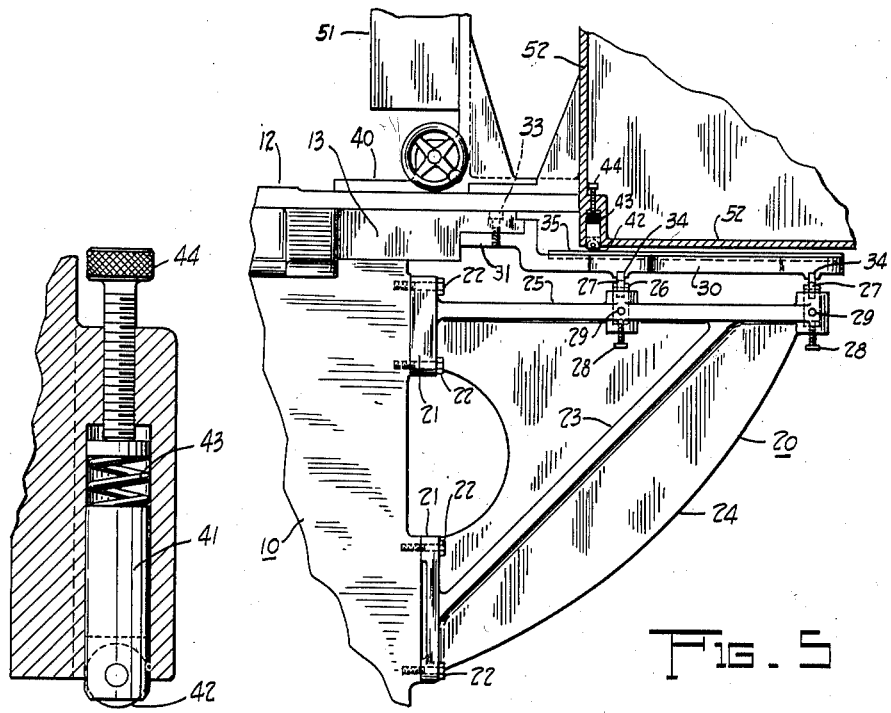
Figure 5 is an enlarged front view of the support showing it mounted on the surface grinder base with an optical viewer sustained thereon.
Figure 6:
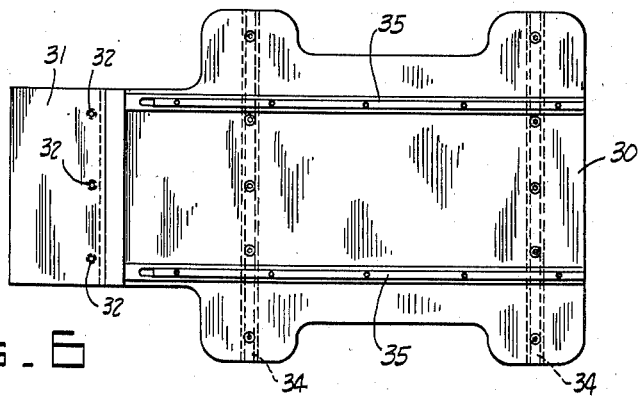
Figure 6 is a top plan view of the transfer plate.
Figure 7:
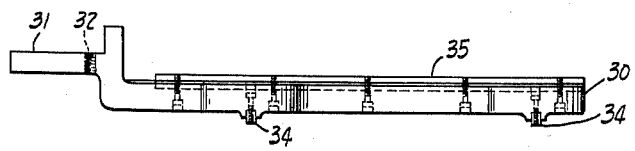
Figure 7 is a front elevation of the same.

The optical viewer 50 is mounted on top of the carriage 40 as shown in the Figures 1 and 5. The bracket rollers 27 are adjusted in height so that the transfer plate 30 will ride level on all the rollers when the saddle 13, to which it is rigidly attached by means of its tongue 31, moves across the base 10. The tension of the two carriage roller springs 43 is adjusted against the weight of the optical viewer 50 so that the rollers 42 will bear the entire weight of the optical viewer as they ride on the transfer plate rails 35. Thus the depressing weight of the viewer assembly is equalized and removed from the table end, thereby insuring the free and level movement of the table even when moved to its extreme positions on the saddle 13, the springs 43 act to counterbalance the downward force created by the weight of the viewer 50 against the supportive force of the bracket 20.

Cross-feeding of the saddle carries the transfer plate rails 34 over the bracket rollers 27. Longitudinal movement of the table causes the carriage rollers 42 to travel the length of the transfer plate rails 35.

It will thus be seen that the weight of the optical viewer supported by the carriage rollers 42 is transmitted through the transfer plate 30 and the bracket 40 to the machine base 10 in all possible positions of the saddle and table. There is no overhanging or unbalancing force exerted on the work supporting elements of the machine.

While the optical viewer invented by your applicant has been used to illustrate one use of the counterbalancer, it should be understood that other types of auxiliary apparatus may be so supported in association with machine tool tables and saddles.

It will now be clear that there is provided a device which accomplishes the objectives heretofore set forth. While the invention has been disclosed in its preferred form, it is to be understood that the specific embodiment thereof as described and illustrated herein is not to be considered in a limited sense as there may be other forms or modifications of the invention which should also be construed to come within the scope of the appended claims.

I claim:

1. In combination with a machine tool of the type having a transversely movable saddle and a longitudinally movable table mounted thereon, an auxiliary apparatus counterbalancer, comprising in combination, a bracket member adapted to be mounted on the base of the aforesaid machine tool in lateral relation of the said saddle, a transfer plate member rigidly mounted on the side of said saddle in sliding supported engagement with the said bracket member, and a carriage member rigidly mounted on one end of said table above the transfer plate in sliding supported engagement with the upper surface thereof and adapted to support auxiliary apparatus thereon extending beyond the end of said table, whereby, the overbalancing force of said auxiliary apparatus upon the table end is equalized and transferred to the machine tool base through the transfer plate and bracket in all possible relative positions of the saddle and table.

2. In combination with a machine tool of the type having a transversely movable saddle and a longitudinally movable table mounted thereon, an auxiliary apparatus counterbalancer, comprising in combination, a bracket member adapted to be mounted on the base of the aforesaid machine tool in lateral relation to the said saddle and including anti-friction means in the bed thereof, a transfer plate member rigidly mounted on the side of said saddle with its under-side supported by said bracket member anti-friction means and slidable thereon, and a carriage member rigidly mounted on one end of said table above the transfer plate, and including anti-friction means slidably engaged with upper surface thereof, and adapted to support auxiliary apparatus thereon extending beyond the end of said table, whereby the overbalancing force of said auxiliary apparatus upon the table end is equalized and transferred to the machine tool base through the transfer plates and bracket in all possible relative positions of the saddle and table.

3. In combination with a machine tool of the type having a transversely movable saddle and a longitudinally movable table mounted thereon, an auxiliary apparatus counterbalancer, comprising in combination, a bracket member adapted to be mounted on the base of the aforesaid machine tool in lateral relation to the said saddle and including anti-friction means in the bed thereof, a transfer plate member rigidly mounted on the side of said saddle with its underside supported by said bracket member anti-friction means, and slidable thereon, and a carriage member rigidly mounted on one end of said table above the transfer plate and including a pair of spaced equalizing means in sliding engagement with the upper surface of the transfer plate and adapted to support auxiliary apparatus thereon extending beyond the end of said table, whereby the overbalancing force of said auxiliary apparatus on the table end is counterbalanced and transferred to the machine tool base through the transfer plate and bracket in all possible relative positions of the saddle and table.

4. In combination with a machine tool of the type having a transversely movable saddle and a longitudinally movable table mounted thereon, an auxiliary apparatus counter-balancer, comprising, in combination, a bracket member adapted to be mounted on the base of the aforesaid machine tool laterally of said saddle and including a plurality of spaced anti-friction rollers mounted thereon, each of the said rollers being rotatable on axes perpendicular to the ways of said saddle; a transfer plate rigidly mounted on the side of said saddle and extending over the said bracket, the said transfer plate having a first pair of transversely extending rails on the under side thereof and a second pair of longitudinally extending rails on the upper side thereof, the first pair of rails being slidably engaged with the bracket rollers; and a carriage member rigidly mounted on the end of said table above the transfer plate and including a pair of transversely spaced dependant rollers rotatably engaged with the said second pair of rails, the said carriage being adapted to support auxiliary apparatus thereon extending beyond the end of said table, whereby the overbalancing force of said apparatus is transferred to the machine tool base through the several rollers, transfer plate and bracket in all possible relative positions of the saddle and table.

5. In combination with a machine tool of the type having a transversely movable saddle and a longitudinally movable table mounted thereon, an auxiliary apparatus counter-balancer, comprising in combination, a bracket member adapted to be mounted on the base of the aforesaid machine tool laterally of said saddle and including a plurality of spaced anti-friction rollers mounted thereon, each of the said rollers being rotatable on axes perpendicular to the ways of said saddle; a transfer plate rigidly mounted on the side of said saddle and extending over the said bracket, the said transfer plate having a first pair of transversely extending rails on the under side thereof and a second pair of longitudinally extending rails on the upper side thereof, the first pair of rails being slidably engaged with the bracket rollers; and an auxiliary apparatus supporting carriage rigidly mounted on the end of said table above the transfer plate and having a pair of dependent spring pressed rollers mounted thereon, aligned with the said second pair of rails and in rolling engagement therewith, and spring compression adjusting means adapted to control the pressure of the spring against the carriage rollers, whereby the weight of the said auxiliary apparatus is counterbalanced and transferred to the machine tool base through the several rollers, transfer plate and bracket in all possible relative positions of the saddle and table.

6. In combination with a machine tool of the type having a transversely movable saddle and a longitudinally movable table mounted thereon, an auxiliary apparatus counterbalancer, comprising in combination, a bracket member adapted to be mounted on the base of the aforesaid machine tool laterally of said saddle and including a plurality of spaced anti-friction rollers mounted thereon, each of the said rollers being rotatable on axes perpendicular to the ways of said saddle; a transfer plate rigidly mounted on the side of said saddle and extending over said bracket, the said transfer plate having a first pair of spaced rails, extending parallel to the saddle ways, on the underside thereof, and a second pair of spaced rails on the upper side thereof extending parallel to the table ways, the said transfer plate being supported on the bracket rollers by means of the first pair of rails; and an auxiliary apparatus supporting carriage rigidly mounted on the end of said table above the transfer plate, the said carriage having equalizing means comprising a pair of dependent plungers slidably mounted in vertically extending sockets aligned with the said second pair of spaced rails, each of the said plungers having a roller mounted on the lower end thereof engaged with one of the said second pair of rails and rotatably on an axis perpendicular to the table ways, a spring mounted in each socket between the plunger and the socket base constantly urging the plunger and roller downward against the said second pair of rails, and spring compressive means mounted in the socket base and adapted to adjustably press against the upper end of the spring, whereby the overbalancing force of said auxiliary apparatus upon the table end is counterbalanced by adjustment of the spring and transferred to the machine tool base through the several rollers, transfer plate and bracket in all possible relative positions of the saddle and table.

GEORGE BANKO.

No references cited.